United States Patent [19]

Redman

[11] Patent Number: 4,757,598
[45] Date of Patent: Jul. 19, 1988

[54] TWO SPEED TRANSMISSION FOR POWER DRIVEN THREADING MACHINE

[75] Inventor: James C. Redman, Amherst, Ohio

[73] Assignee: Emerson Electric Co., St. Louis, Mo.

[21] Appl. No.: 123,717

[22] Filed: Nov. 23, 1987

[51] Int. Cl.$^4$ .................. B23G 1/22; B23P 23/00
[52] U.S. Cl. ......................... 29/560; 10/87;
   10/89 R; 408/23; 408/133
[58] Field of Search ............ 10/87, 89 R, 90, 105,
   10/129 R, 136 SC, 136 TS; 29/33 T, 560;
   408/28, 36, 125, 132, 133, 20, 23; 82/29 R

[56] References Cited

U.S. PATENT DOCUMENTS

| | | | |
|---|---|---|---|
| 1,635,447 | 7/1927 | Vosper | 10/87 X |
| 1,675,182 | 6/1928 | Lilleberg | 82/94 |
| 1,943,643 | 1/1934 | Vosper | 10/87 X |
| 1,947,874 | 2/1934 | Pealer | 10/87 |
| 3,413,667 | 12/1968 | Behnke | 10/89 R |
| 3,599,261 | 8/1971 | Fohl | 10/87 |
| 4,025,219 | 5/1977 | Baumann et al. | 408/29 |
| 4,123,192 | 10/1978 | Ruland | 408/133 |
| 4,426,178 | 1/1984 | Wucher | 408/28 |

Primary Examiner—E. Michael Combs
Attorney, Agent, or Firm—Body, Vickers & Daniels

[57] ABSTRACT

A transmission is disclosed for rotating the work supporting chuck assembly of a power driven threading machine at low and high speeds. The transmission includes a sun gear, a ring gear coaxial with the sun gear and axially shiftable between first and second positions relative to the sun gear and to a fixed clutch component, and a plurality of planet gears between the sun gear and ring gear. The sun gear is motor driven to provide the transmission input, and the planet gears are connected to and drive an output sprocket wheel drivingly connected to the chuck assembly. The first position of the ring gear provides clutched interengagement thereof with the sun gear for rotation therewith, whereby the planet gears rotate therewith to rotate the output sprocket wheel at a first speed equal to the speed of rotation of the sun gear. The second position of the ring gear provides for clutched engagement thereof with the fixed clutch component such that the sun gear rotates the planet gears relative to the ring gear, whereby the output sprocket wheel is driven at a second speed which is less than the speed of rotation of the sun gear. The ring gear is axially shifted between its first and second positions through a yoke mechanism which includes high speed and low speed springs by which the clutched engagement of the ring gear with the sun gear is achieved with a first biasing force and the clutched engagement between the ring gear and fixed clutch component is achieved with a second biasing force which is greater than the first force.

27 Claims, 4 Drawing Sheets

TWO SPEED TRANSMISSION FOR POWER DRIVEN THREADING MACHINE

BACKGROUND OF THE INVENTION

The present invention relates to the art of power driven threading machines and, more particularly, to a two speed transmission by which the workpiece supporting and rotating chuck assembly of a threading machine is selectively rotatable at two different speeds.

It is of course well known that power driven threading machines generally include tools for cutting and reaming as well as threading workpieces such as rods or pipes. It is likewise well known to provide for rotating the workpiece supporting chuck assembly of such a threading machine at high and low speeds. In this respect, high speed rotation accommodates the cutting and reaming of both small and large diameter workpieces and the threading of smaller diameter workpieces, whereas low speed rotation is necessary in connection with the threading of larger diameter workpieces. More particularly, the threading of larger diameter workpieces imposes higher torque on the component parts of the machine, whereby low speed rotation is necessary to protect the component parts of the cutting die head, chuck assembly and drive train against undesirable wear and/or damage.

Heretofore, two speed drive of a threading chuck assembly has been achieved by heavy, structurally complex and expensive gearshifting mechanisms which, in addition to the foregoing drawbacks, cannot be shifted between speeds during the cutting of threads on a workpiece. Rather, to assure against damage to the transmission gears, such mechanisms require shutting the machine down and retracting the tools from the workpiece during a gear changing operation. Further, shifting of the transmission gears is often physically difficult and in this respect generally requires that the operator actuate a gearshifting lever with one hand while jogging the chuck assembly with the other hand to obtain alignment between the gears which is necessary to facilitate shifting. In any event, gear transmissions are noisey in operation, gearshifting is noisey, and considerable time is consumed in shutting down the machine, moving the tools, shifting the gears, restarting the machine, and repositioning the tools relative to the workpiece. It will be appreciated that the latter lends to inefficient use of both the machine and the operator's time.

SUMMARY OF THE INVENTION

In accordance with the present invention, a two speed transmission is provided for a power driven thread cutting machine which advantageously minimizes or overcomes the foregoing and other disadvantages of transmissions heretofore provided for such machines. More particularly, a two speed transmission provided in accordance with the present invention is structurally simple and economical to produce, is quiet in operation, and is shiftable between the two speeds while the machine is operating and under load or no-load conditions. Moreover, shifting is achieved quietly and requires only the displacement of a speed shifting lever by the machine operator, whereby shifting is achieved quickly and with minimum physical effort on the part of the operator so as to optimize efficiency in connection with use of the machine and the operator's time.

The foregoing attributes are achieved in accordance with the invention by a planetary gear transmission comprising sun, ring and planet gear components and in which the ring gear is shiftable to achieve the changes in speed. More particularly, the ring gear is shiftable between a first position in which it engages with the sun gear and a second position in which it disengages from the sun gear and engages with a component fixed relative to the base or frame of the machine. The sun gear is driven to provide the input to the transmission and the planet gears are connected to an output component of the transmission which in turn is connected to the chuck assembly of the threading machine. When the ring gear is in its first position, the sun, ring and planet gears are locked together and rotate as a unit, whereby the output component is rotated at the speed of rotation of the sun gear to provide high speed rotation of the chuck assembly. When the ring gear is in its second position it is held against rotation by the fixed component on the machine. Therefore, rotation of the sun gear imparts rotation to the planet gears relative to the sun gear and ring gear and thus rotation of the output component and the chuck assembly at a speed lower than the speed of rotation of the sun gear.

Preferably, the engagement between the ring and sun gear and the engagement between the ring gear and the fixed component on the machine are achieved through frictionally interengaging surfaces on the component parts. Further, the ring gear is preferably biased in its first and second positions so as to assure sufficient interengagement between the surfaces to accommodate the torsional loads thereon during machine operation without slippage therebetween. Further in connection with such biasing, it is preferred to provide for the ring gear in the low speed position thereof to be biased against the fixed machine component with a higher force than that with which it is engaged against the sun gear during high speed operation in that the torque imposed on the transmission during thread cutting at the lower speed is greater than that imposed on the transmission during high speed operation. The imposition of different biasing forces promotes assurance against slippage in the transmission and thus damage or excessive wear of the clutching surfaces.

It is accordingly an outstanding object of the present invention to provide an improved two speed shiftable drive transmission for the rotatable chuck assembly of a power driven threading machine.

A further object is the provision of a two speed transmission of the foregoing character which can be shifted regardless of whether or not the machine is in operation and, if in operation, under both load and no-load conditions with respect to the cutting, reaming or threading of a workpiece.

Another object is the provision of a two speed transmission of the foregoing character wherein during engagement between component parts of the transmission is through frictionally interengaging surfaces which are under biasing forces of different magnitudes with respect to the two speeds.

A further object is the provision of a two speed transmission of the foregoing character comprising a planetary gear transmission including a ring gear manually shiftable relative to the sun gear, planet gear and fixed clutch components to achieve speed shifting.

Still another object is the provision of a two speed transmission of the foregoing character which is easily shiftable manually with minimal physical effort on the part of an operator and at any time, thus promoting efficient use of the machine and the operator's time.

Still a further object is the provision of a two speed transmission of the foregoing character which is compact in size, economical to construct, quiet in operation and during shifting, and is efficient in use.

BRIEF DESCRIPTION OF THE DRAWINGS

The foregoing objects, and others, will in part be obvious and in part pointed out more fully hereinafter in connection with the description of a preferred embodiment of the invention illustrated in the accompanying drawings in which.

DESCRIPTION OF THE PREFERRED EMBODIMENT

Figure 1:
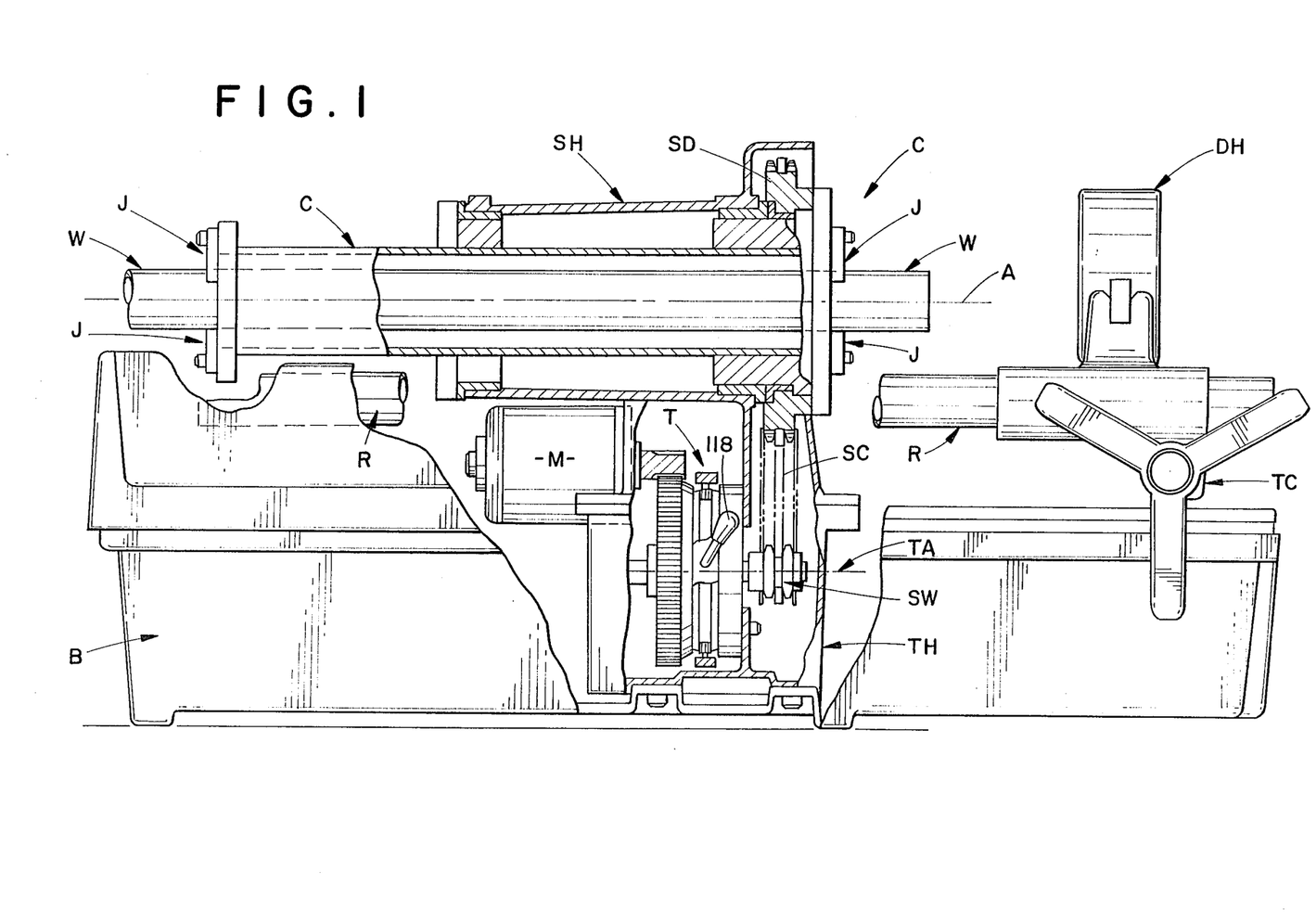
FIG. 1 is a side elevation view somewhat schematically illustrating a power driven threading machine provided with a speed shifting transmission in accordance with the present invention.

Referring now in greater detail to the drawings wherein the showing are for the purpose of illustrating a preferred embodiment of the invention only and not for the purpose of limiting the invention, FIG. 1 somewhat schematically illustrates a power driven threading machine basically comprising a generally pan-shaped base B, a speed shifting transmission T, and a workpiece supporting and rotating chuck assembly C. Chuck assembly C is rotatably supported in a spindle housing SH which is bolted or otherwise mounted on the transmission housing TH which in turn is suitably secured to base B. Transmission T is driven by a reversible electric motor M mounted on transmission housing TH, and the transmission includes an output sprocket wheel SW coupled by means of a sprocket chain SC with a sprocket drive component SD of chuck assembly C, whereby the chuck assembly is rotated in response to rotation of sprocket SW.

It will be appreciated that a transmission in accordance with the present invention can be used in connection with driving any suitable work supporting chuck assembly C, and that the latter can be supported relative to the threading machine frame or base other than by mounting on the transmission housing as shown in FIG. 1. The details of the mounting and supporting of the chuck assembly as well as the operation of the component parts thereof in connection with supporting and rotating a workpiece do not form a part of the present invention and, in this respect, it is only necessary to understand that the workpiece supporting chuck assembly is driven by the transmission output and includes a plurality of jaws J at the opposite ends thereof for engaging and supporting a workpiece W for rotation about a chuck or machine axis A. A suitable chuck assembly for the foregoing purpose is disclosed in my co-pending patent application Ser. No. 123,719, filed Nov. 23, 1987 and assigned to the same assignee as the present invention and the disclosure of which application is incorporated herein by reference.

As is further well known, a threading machine of the character to which the present invention relates generally includes a tool carriage TC supported on and movable along a pair of support rods R extending along laterally opposite sides of the machine. The tool carriage carries or is adapted to support a variety of metalworking tools, such as workpiece cutting and reaming tools and a thread cutting die head as schematically illustrated in FIG. 1 and designated DH. Again, the arrangement by which tool carriage TC is supported relative to other component parts of the machine is not important, and in the embodiment schmatically illustrated and as shown in my aforesaid co-pending patent application, support rods R are supported in openings provided therefore along laterally opposite sides of the depending mounting portion of spindle housing SH.

Figure 2:
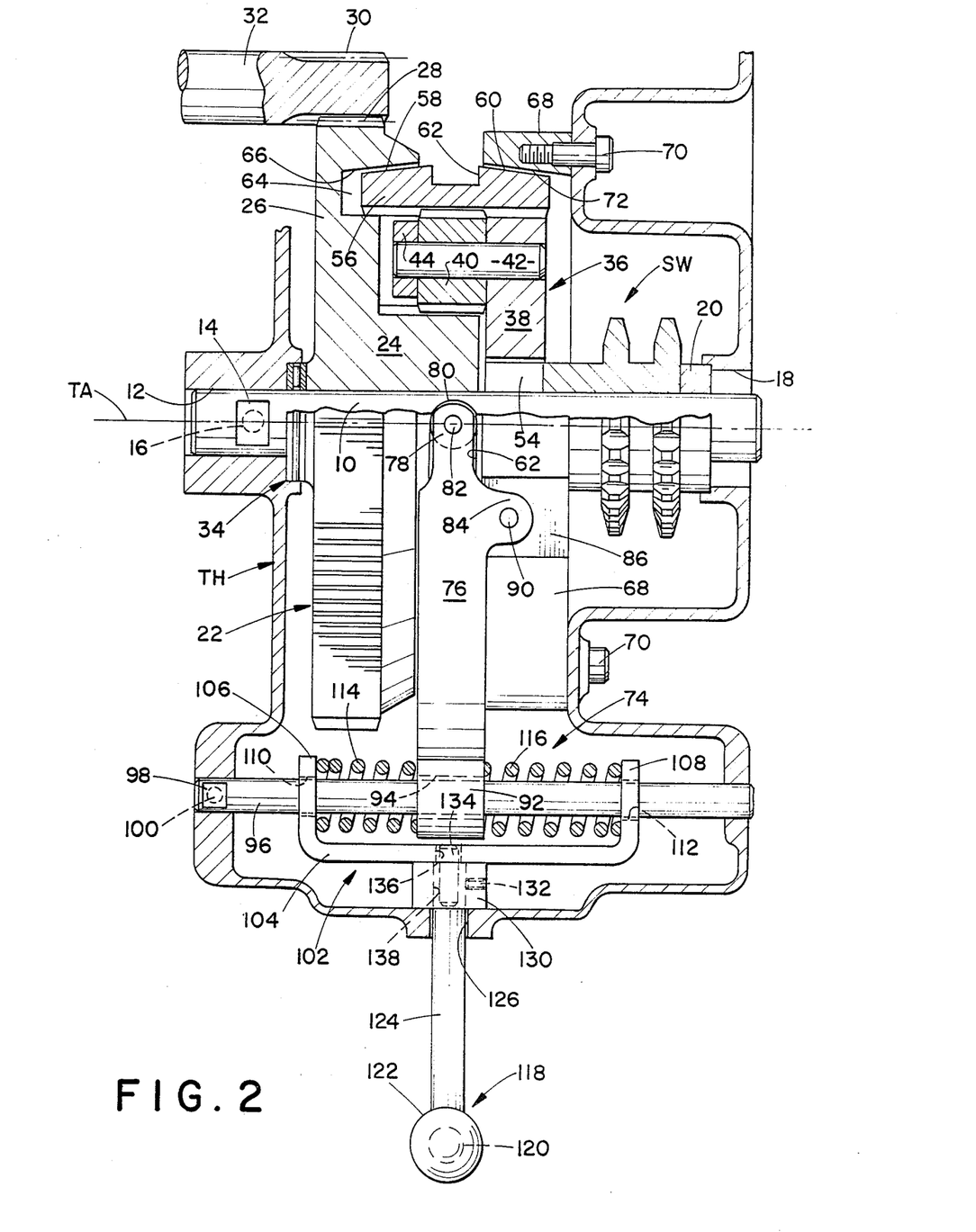
FIG. 2 is a plan view partially in section, of the speed shifting transmission shown in FIG. 1.
Figure 3:
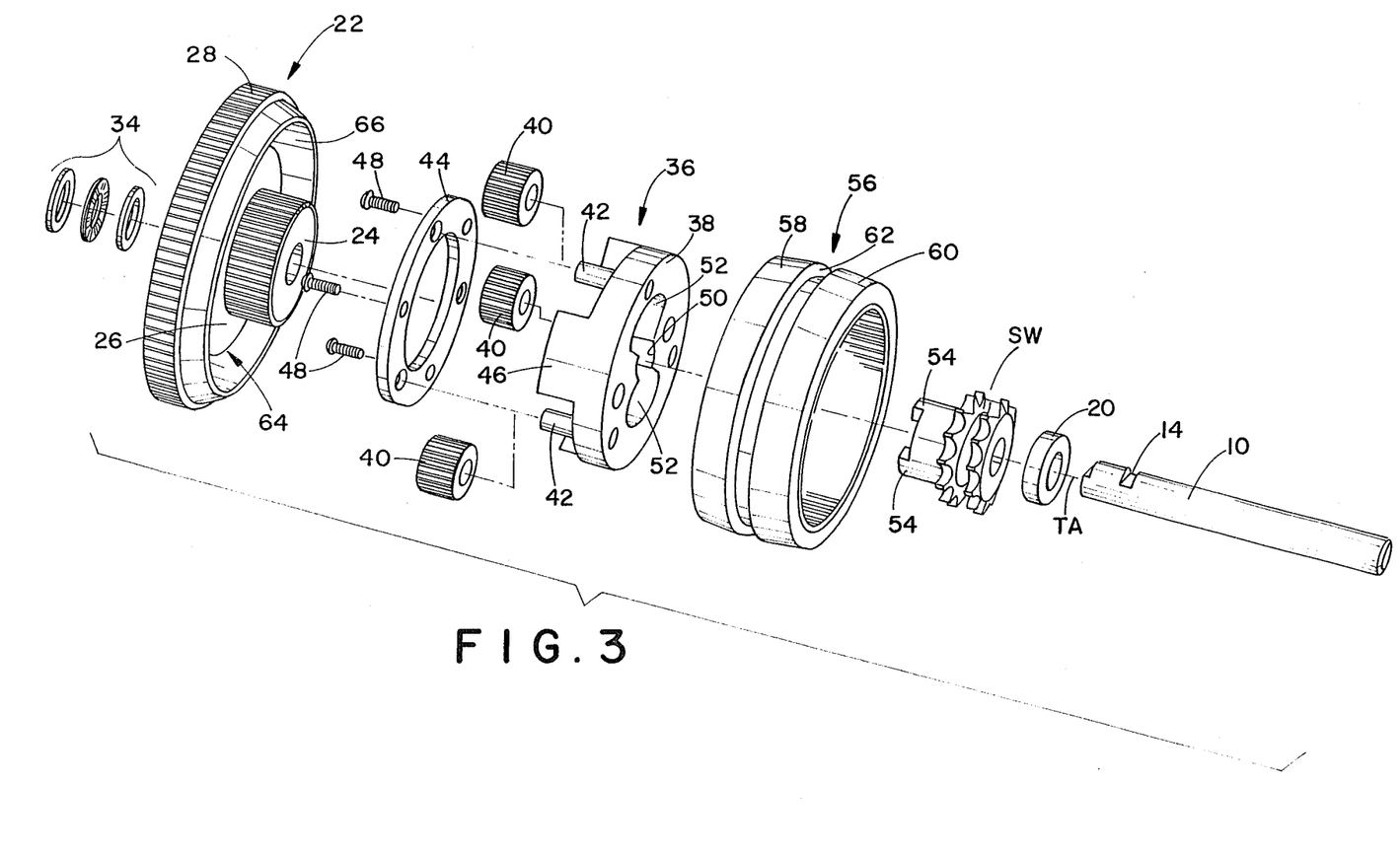
FIG. 3 is an exploded perspective view of the driving and driven parts of the transmission; and, FIG. 4 is an exploded perspective view of the transmission shifting mechanism.
Figure 4:
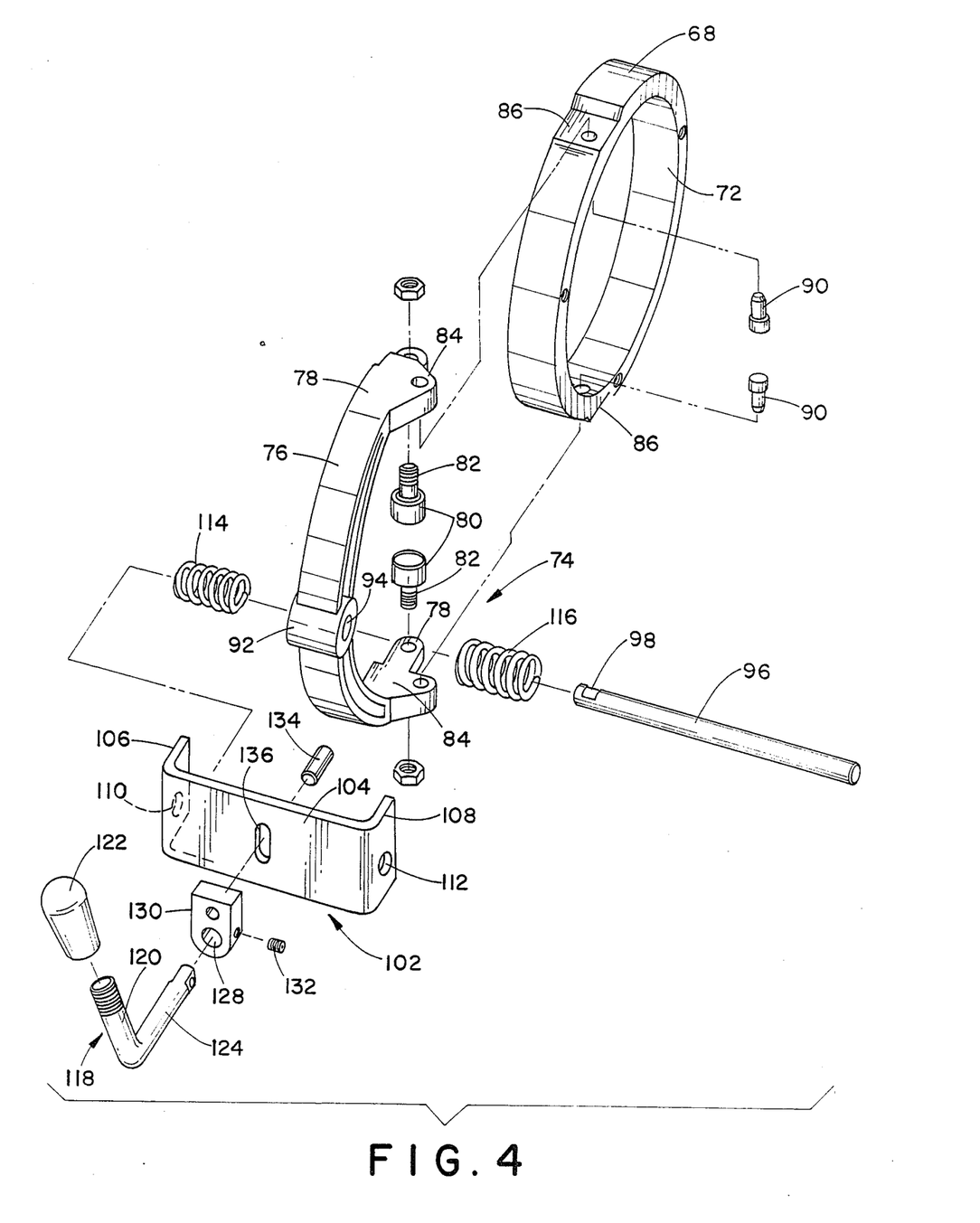

With reference now to FIGS. 2-4 in conjunction with FIG. 1, transmission T includes a support shaft 10 supported in transmission housing TH and providing a transmission axis TA. More particularly in this respect, the transmission housing is provided with a shaft opening 12 receiving one end of shaft 10 which is provided with a flat 14 by which the shaft is secured to the transmission housing against rotation such as by means of a set screw 16. The other end of shaft 10 is supported in an opening 18 in the transmission housing by means of a thrust spacer ring 20 which is positioned in the opening and against a shoulder provided in the opening therefor. The transmission components include an input gear 22 having an integral, externally toothed sun gear portion 24 and a radially outwardly extending flange 26. Flange 26 has a toothed outer periphery 28 engaged with the teeth of a pinion gear 30 secured to output shaft 32 of motor M for rotation therewith. A thrust bearing and washer assembly 34 surrounds shaft 10 and is interposed between input gear 22 and the adjacent wall of the transmission housing. The transmission components further include a planet gear assembly 36 which, in the embodiment disclosed, includes a carrier plate 38 having a plurality of planet gears 40 rotatably mounted thereon by means of corresponding pins 42, and an annular retaining plate 44 which, as will be appreciated from FIG. 3, is secured to portions 46 of carrier plate 38 by means of fasteners 48. The teeth of planet gears 40 engage the teeth of sun gear 24, and carrier plate 38 is mounted on shaft 10 for rotation relative thereto. In this respect, the carrier plate is provided with an opening therethrough including diametrically opposed arcuate segments 50 engaging about a portion of shaft 10 and diametrically opposed radially outwardly diverging openings 52 which axially receive correspondingly contoured diametrically opposed coupling projections 54 on sprocket wheel SW. Sprocket wheel SW is also supported on shaft 10 for rotation relative thereto, whereby rotation of planet gear assembly 36 rotates sprocket wheel SW to provide the transmission output by which chuck assembly C of the threading machine is driven.

Transmission T further includes an internally toothed ring gear 56 coaxial with axis TA and the teeth of which are in meshing engagement with planet gears 40. As will be described hereinafter, ring gear 56 is selectively shiftable to the left and right from a neutral position shown in FIG. 2 to respectively achieve high speed and low speed driving of sprocket wheel SW from the same constant input speed of motor shaft 32. Ring gear 56 has a radially outer peripheral surface provided with first and second circumferentially continuous conical surfaces 58 and 60, respectively, and a circumferentially continous groove 62 between surfaces 58 and 60. Flange 26 of input gear 22 has an axially inner side facing ring gear 56 and provided with a circumferentially continuous annular recess 64 which provides flange 26 with a radially outer wall 66 having a conical contour corresponding to that of surface 58 of the ring gear. Thus, as will be appreciated from FIG. 2, wall 66 diverges relative to transmission axis TA in the direction toward ring gear 56. An annular clutch member 68 is mounted on transmission housing TH coaxial with axis TA by means of fasteners 70 and includes a circumferentially continuous conical wall 72 matingly contoured with respect to second surface 60 on ring gear 56. Thus, as will again will be appreciated from FIG. 2, wall 72 diverges relative to axis TA in the direction toward the ring gear. Walls 66 and 72 radially and axially overlie first and second ring gear surfaces 58 and 60, respectively, and the pairs of surfaces 58 and 66 and 60 and 72 provide frictionally interengageable clutching surfaces which function in connection with a speed shifting operation as set forth more fully hereinafter.

Shifting of ring gear 56 to the left and right in FIG. 2 is achieved by way of a manually operated shifting mechanism 74 which includes a generally U-shaped yoke member 76 extending about ring gear 56 and having diametrically opposed ends 78 overlying groove 62 in the ring gear and provided with corresponding cam members in the form of rollers 80. Rollers 80 are rotatably mounted on the yoke ends by means of pins 82 and are disposed in groove 62 between the axially opposite sides thereof. Yoke member 76 has mounting ears 84 spaced from ends 78 and overlying flats 86 on the outer surface of clutch member 68, and corresponding pins 90 serve to mount the yoke member on clutch member 68 for pivotal displacement about an axis transverse to transmission axis TA and defined by pins 90.

Yoke member 76 is provided generally centrally between opposite ends 78 thereof with an enlargement 92 which is provided with an axially extending opening 94 therethrough. A yoke rod 96 extends loosely through opening 94 and has its opposite ends disposed in corresponding openings therefor in transmission housing TH. One of the rod ends is provided with a flat 98 which facilitates securing the rod in place relative to housing TH such as by means of a set screw 100. A generally U-shaped bracket 102 has a bridging portion 104 extending axially parallel to rod 96 and across enlargement 92 of yoke 76. The bracket further includes legs 106 and 108 at opposite ends of the bridging portion and extending transverse to rod 96, which legs are provided with corresponding openings 110 and 112 through which rod 96 extends. Openings 110 and 112 provide for the bracket to be slidably displaced in axially opposite directions relative to the rod. For the purpose set forth hereinafter, a first coiled compression spring 114 surrounds rod 96 between bracket leg 106 and the corresponding side of yoke enlargement 92, and a second coiled compression spring 116 surrounds rod 96 between bracket leg 108 and the corresponding side of enlargement 92. Preferably, and for the purpose set forth hereinafter, spring 114 has a force rating less than the force rating of spring 116. In the preferred embodiment, spring 114 has a force rating which is about one-half the force rating of spring 116.

Bracket 102 is shifted to the left and right in FIG. 2 along rod 96 by means of an L-shaped manually pivotal lever 118 having one leg 120 provided with an operating knob 122 and the other leg 124 extending through an opening 126 therefor in the transmission housing. Leg 124 further extends through an opening 128 in a drive block 130 which is secured thereto by means of a set screw 132. Opening 126 supports lever 118 for pivotal displacement in opposite directions about the axis of leg 124, and drive block 130 is provided with a pin 134 which is offset from the axis of leg 124 and extends through a vertical slot 136 in bridging portion 104 of bracket 102.

When the component parts are in the positions thereof shown in FIG. 2, leg 120 of operating lever 118 is in a vertical disposition and the transmission is in a neutral position, whereby first and second surfaces 58 and 60 of ring gear 56 are spaced from the opposed clutch surfaces 66 and 72 of drive gear 22 and clutch component 68, respectively. Accordingly, rotation of gear 22 by pinion 30 and thus rotation of sun gear 24 provides for planet gears 40 to rotate ring gear 56, whereby there is no output drive to sprocket wheel SW. In connection with the latter, it will be appreciated that there is sufficient frictional resistance to rotation of threading machine chuck C and thus resistance to rotation of sprocket wheel SW through sprocket chain SC to preclude rotation of planet gear carrier plate 38 in the neutral position, whereby the planet gears rotate the ring gear as described. If it is desired to shift the transmission into the high speed mode thereof, lever 118 is pivoted clockwise or to the right in FIG. 2 whereupon pin 134 displaces bracket 102 to the right along rod 96. Such displacement of bracket 102 pushes spring 114 against yoke enlargement 92 to pivot yoke 76 counterclockwise about the axes of pins 90, whereby rollers 80 shift ring gear 56 to the left in FIG. 2 relative to planet gears 40 to bring conical surfaces 58 and 66 into frictional clutching interengagement. When such engagement is achieved, further displacement of bracket 102 to the right in FIG. 2 compresses spring 114 to impose a biasing force against ring gear 56 in the direction of engagement between surfaces 58 and 66. Lever 118 and thus ring gear 56 is releaseably held in the high speed position by interengagement between pin 134 and slot 136. More particularly in this respect, pivotal movement of pin 134 about the axis of lever leg 124 terminates when the pin reaches the bottom of slot 136 and, in the latter position, the pin is slightly below the horizontal plane of the axis of leg 124. Accordingly, the pin and slot interengage to preclude unintentional displacement of lever 118 back toward the neutral position, and bracket 102 is held thereby in the high speed position and against the force of spring 114 which then imposes the desired biasing force on ring gear 56 through yoke 76. In the high speed position, ring gear 56 is interengaged with sun gear 24 for rotation therewith and accordingly, locks planet gears 40 and thus carrier plate 38 for rotation with the sun gear and ring gear. Therefore, sprocket wheel SW is driven at a high speed which is the speed of rotation of sun gear 24 as determined by rotation of the latter by drive pinion 30. Sprocket chain SC, of course, then drives chuck assembly C at a first speed proportional to the speed of sprocket wheel SW and which first speed is the high speed for the chuck assembly.

When it is desired to shift the transmission into the low speed mode, the operator pivots lever 118 counterclockwise about the axis of leg 124 or to the left in FIG. 2, whereupon pin 134 pivots counterclockwise to first return bracket 102 and thus yoke 76 and ring gear 56 to the neutral positions thereof. Further counterclockwise pivoting of lever 118 causes pin 134 to displace bracket 102 to the left in FIG. 2 along rod 96 whereupon spring 116 pushes against yoke enlargement 92 to pivot yoke 76 clockwise about the axes of pins 90, whereby rollers 80 engage ring gear groove 62 to shift ring gear 56 to the right in FIG. 2 to bring clutch surfaces 60 and 72 into clutching interengagement. Continued counterclockwise pivotal movement of lever 118 further displaces bracket 102 to the left thus compressing spring 116 and imposing a biasing force against ring gear 56 in the direction of clutch component 68. As in the high speed direction, when pin 134 reaches the bottom of slot 136 bracket 102 is locked in the low speed position against the bias of spring 116 which thus imposes the desired biasing force against ring gear 56 relative to clutch component 68. In these positions of the component parts, ring gear 56 is restrained against rotating with sun gear 24, whereby rotation of the latter by drive pinion 30 causes planet gears 40 to rotate relative to the sun gear and ring gear to rotate carrier plate 38 and thus sprocket wheel SW at a slower speed than the speed of rotation of the sun gear. Accordingly, chuck assembly C of the threading machine is driven at a second speed proportional to the low speed of sprocket wheel SW and which second speed is the low speed for the chuck assembly.

As mentioned hereinabove, spring 114 has a spring force of about one-half the spring force of spring 116 and, as will be appreciated from the foregoing description, the biasing force of spring 114 is imposed on ring gear 56 in the high speed mode and the biasing force of spring 116 is imposed on the ring gear in the low speed mode. This arrangement advantageously provides for imposing a higher clutching force in the low speed mode so as to preclude slippage between the frictionally interengaged surfaces in response to the higher torque which is imposed back on the transmission during the performance of work on a workpiece with the threading machine operating in its low speed mode. The imposition of torque back on the transmission during high speed working operations is not as great and, accordingly, the frictionally interengaged surfaces between the ring gear and sun gear can be restrained from relative slippage with a lesser biasing force. In the embodiment disclosed herein, the threading machine is designed to accommodate the threading of workpieces up to two inches in diameter. In connection with the loads imposed on the transmission by such threading operations, springs 114 and 116 having force ratings of 250 lbs/inch and 500 lbs/inch, respectively, have been found to provide the desired clutching forces for high and low speed operation. Advantageously, rollers 80 can accommodate the different biasing forces, thus avoiding the need for and the frictional engagement and wear which would result from providing the yoke with rigid cam components defined, for example, by integral projections on the yoke ends. More particularly in this respect, the rollers can accommodate the load imposed thereon by the lower force of spring 114 during rolling engagement with groove 62 in connection with high speed operation, and the increased loading of the rollers by spring 116 can be accommodated by the rollers in connection with low speed operation in that there is no rolling engagement between the rollers and ring gear groove in the low speed mode which would promote wearing of the rollers and their support pins. Furthermore, it will be appreciated for the latter reason that rollers could not be used practically if both springs 114 and 116 had the same high force rate of spring 116.

It will be appreciated from the foregoing description that an operator of the machine can shift the transmission between the two speeds at any time. In this respect, the axially aligned frictionally interengaging clutch surfaces advantageously avoid having to stop the machine to achieve alignment between component parts of the transmission in connection with changing speeds. The ability to change speeds while the machine is in operation is of considerable advantage. For example, if an operator initiates the threading of a workpiece at high speed and it becomes apparent as threading progresses that the threading would best be completed at low speed, the operator can quickly shift speeds and complete the threading operation without stopping the machine and thus without any loss of production time. Similarly, if the operator is performing cutting and remaining operations on a workpiece at high speed and threading of the workpiece is to be done at low speed, the operator can complete the high speed operations, shift speeds and continue with the threading operation again without any loss in production time.

While considerable emphasis has been placed herein on the specific structures and structural interrelationships between the component parts of the preferred embodiment, it will be appreciated that other embodiments as well as changes in the preferred embodiment can be made without departing from the principles of the invention. In this respect, the interengaging clutching surfaces could be other than conical and, for example, could be axially opposer planar surfaces. Further, it would be possible to reverse the input and output arrangement disclosed with respect to the transmission and, in connection with the use of biasing springs of different force, to reverse the positions thereof relative to the pivotal yoke. Such an arrangement would reverse the relationship between the input and output speeds in that engagement of the ring gear with the fixed clutch component would provide the high speed output while clutched engagement with the sun gear would provide the low speed output. Other changes and modifications will be suggested and obvious to those skilled in the art upon reading the foregoing description of the preferred embodiment, whereby it is to be distinctly understood that the foregoing descriptive matter is to be interpreted merely as illustrative of the invention and not as a limitation.

Having thus described the invention, it is claimed:

1. A power driven threading machine comprising, base means, rotatable chuck means having an axis and axially opposite ends, jaw means at said opposite ends of said chuck means for gripping a workpiece, said chuck means being supported on said base means for rotation about said chuck axis, and means including transmission means for driving said chuck means in a threading direction about said chuck axis and selectively at two different speeds, said transmission means having an axis and including input means, output means and planetary gear means therebetween, said planetary gear means including sun gear means coaxial with said transmission axis and connected to one of said input and output means, ring gear means coaxial with said sun gear means, and planet gear means coaxial with said sun gear means, said planet gear means being radially between said sun gear means and said ring gear means and connected to the other of said input and output means, said ring gear means being axially shiftable relative to said sun gear means and planet gear means between first and second positions, first clutch means interengaging said ring gear means and sun gear means in said first position of said ring gear means for rotation together, whereby said planet gear means rotate therewith and said output means is driven at a first speed, second clutch means engaging said ring gear means in said second position thereof against rotation with said sun gear means whereby said planet gear means rotates relative to said sun gear means and said ring gear means and said output means is driven at a second speed different from said first speed, means connecting said output means to said chuck means, and means to selectively shift said ring gear means between said first and second positions.

2. A threading machine according to claim 1, wherein one of said first and second ring gear positions is a high speed position and the other is a low speed position, first biasing means imposing a first biasing force against said ring gear means in said high speed position thereof, and second biasing means imposing a second biasing force against said ring gear means in said low speed position.

3. A threading machine according to claim 2, wherein said second biasing force is greater than said first.

4. A threading machine according to claim 1, wherein said first clutch means includes first surface means on said ring gear means frictionally interengageable with clutch surface means on said sun gear means, and said second clutch means includes clutch member means coaxial with said ring gear means and fixed against rotation about said transmission axis, said clutch member means including clutch surface means, and second surface means on said ring gear means frictionally interengageable with said clutch surface means on said clutch member means.

5. A threading machine according to claim 1, wherein said ring gear means has an outer periphery including a radially inwardly extending circumferentially continuous groove, and said means to selectively shift said ring gear means includes yoke means pivotal about a pivot axis transverse to said transmission axis and having cam means thereon spaced from said pivot axis and received in said groove, whereby pivotal movement of said yoke means in opposite directions about said pivot axis shifts said ring gear means in axially opposite directions between said first and second positions thereof.

6. A threading machine according to claim 5, wherein one of said first and second ring gear positions is a high speed position and the other is a low speed position, first biasing means imposing a first biasing force against said ring gear means in said high speed position thereof, and second biasing means imposing a second biasing force against said ring gear means in said low speed position thereof.

7. A threading machine according to claim 6, wherein said yoke means has high and low speed positions corresponding respectively to said high and low speed positions of said ring gear means, said first and second biasing means acting against said yoke means respectively in said high and low speed positions thereof to impose said first and second biasing forces against said ring gear means.

8. A threading machine according to claim 7, wherein said second biasing force is greater than said first biasing force.

9. A threading machine according to claim 8, wherein said first clutch means includes first surface means on said ring gear means frictionally interengageable with clutch surface means on said sun gear means, and said second clutch means includes clutch member means coaxial with said ring gear means and fixed against rotation about said transmission axis, said clutch member means including clutch surface means, and second surface means on said ring gear means frictionally interengageable with said clutch surface means on said clutch member means.

10. A threading machine according to claim 9, wherein said sun gear means is connected to said input means and said planet gear means is connected to said output means.

11. A power driven threading machine comprising, base means, rotatable chuck means having an axis and axially opposite ends, jaw means at said opposite ends of said chuck means for gripping a workpiece, said chuck means being supported on said base means for rotation about said chuck axis, and means including transmission means for driving said chuck means in a threading direction about said chuck axis and selectively at two different speeds, said transmission means having an axis and including sun gear means, ring gear means and planet gear means coaxial with said transmission axis, said planet gear means being radially between said sun gear means and said ring means, means for driving said sun gear means at a first speed, said ring gear means being axially shiftable relative to said sun gear means and planet gear means between first and second positions, said ring gear means having first surface means and said sun gear means having clutch surface means frictionally engaging with said first surface means when said ring gear means is in said first position, whereby said sun gear means, ring gear means and planet gear means rotate together at said first speed, clutch member means coaxial with said ring gear means and fixed against rotation about said transmission axis, said ring gear means having second surface means and said clutch member means having clutch surface means frictionally engaging with said second surface means when said ring gear means is in said second position, whereby said ring gear means is engaged against rotation with said sun gear means and said planet gear means rotates relative to said sun gear means and ring gear means at a second speed less than said first speed, means for drivably connecting said planet gear means to said chuck means, and means for selectively shifting said ring gear means between said first and second positions thereof.

12. A threading machine according to claim 11, wherein said first and second surface means on said ring gear means and said clutch surface means on said sun gear means and clutch member means are conical surfaces.

13. A threading machine according to claim 11, wherein said means for selectively shifting said ring gear means includes first and second biasing means respectively imposing a biasing force against said ring gear means in said first and second positions thereof.

14. A threading machine according to claim 13, wherein said second biasing means imposes a greater force on said ring gear means than said first biasing means.

15. A threading machine according to claim 11, wherein said ring gear means has an outer periphery including a radially inwardly extending circumferentially continuous groove, and said means to selectively shift said ring gear means includes yoke means pivotal about a pivot axis transverse to said transmission axis and received in said groove, whereby pivotal movement of said yoke means in opposite directions about said pivot axis shifts said ring gear means in axially opposite directions between said first and second positions thereof.

16. A threading machine according to claim 15, wherein said yoke means extends about the outer periphery of said ring gear means and has diametrically opposite ends overlying said groove, said cam means including rollers mounted on each of said opposite ends for rotation about axes transverse to said transmission axis.

17. A threading machine according to claim 16, wherein said yoke means includes mounting means spaced inwardly of each of said opposite ends, means pivotally connecting said mounting means to said clutch member means and providing said pivot axis, said means to selectively shift said ring gear means further including yoke actuator means for pivoting said yoke means.

18. A threading machine according to claim 17, wherein said first and second surface means on said ring gear means and said clutch surface means on said sun gear means and clutch member means are conical surfaces.

19. A threading machine according to claim 18, wherein said yoke actuator means includes first spring means imposing a first biasing force on said ring gear means in said first position thereof, and second spring means imposing a second biasing force on said ring gear means in said second position thereof, said second force being greater than said first force.

20. A threading machine according to claim 19, wherein said yoke actuator means further includes a generally U-shaped bracket extending axially across said yoke means at a location circumferentially between said mounting means, said yoke means having axially opposite sides and said bracket including legs axially spaced from and extending radially inwardly of said opposite sides, each said first and second spring means being positioned between one of said bracket legs and the one of said opposite sides facing said one leg, and means supporting said bracket for displacement in axially opposite directions relative to said yoke means.

21. A threading machine according to claim 20, wherein said means supporting said bracket includes rod means extending axially through openings therefor in said bracket legs and said yoke means, said rod means being supported against axial displacement relative to said base means, said first and second spring means being coil springs surrounding said rod means, and manually actuable means for displacing said bracket in axially opposite directions along said rod means.

22. A threading machine according to claim 21, wherein said manually actuable means includes lever means supported relative to said base means for pivotal displacement in opposite directions about a lever axis transverse to said transmission axis, said bracket including a bridging portion between said bracket legs, said lever means having an end adjacent said bridging portion, and cam and follower means interengaging said lever end and said bridging portion for axially displacing said bracket in response to pivotal displacement of said lever means.

23. A threading machine according to claim 11, wherein said sun gear means includes radially outwardly extending flange means, said clutch member means is axially spaced from said flange means, and said ring gear means is axially between said flange means and said clutch member means, said flange means including a conical wall diverging relative to said transmission axis in the direction toward said ring gear means and providing said clutch surface means on said sun gear means, said clutch member means including a conical wall diverging relative to said transmission axis in the direction toward said ring gear means and providing said clutch surface means on said clutch means, said ring gear means having an outer periphery, and said first and second surface means on said ring gear means being conical surfaces on said outer periphery contoured for mating engagement with the corresponding one of said conical clutch surface means on said sun gear means and clutch member means.

24. A threading machine according to claim 23, wherein said outer periphery of said ring gear means includes a radially inwardly extending circumferentially continuous groove axially between said first and second surfaces on said outer periphery thereof, said means for selectively shifting said ring gear means including yoke means extending about said outer periphery of said ring gear means and having diametrically opposite ends overlying said groove, cam means on said opposite ends and received in said groove, means mounting said yoke means on said clutch member means and providing said pivot axis for said yoke means, and yoke actuator means for pivoting said yoke means.

25. A threading machine according to claim 24, wherein said yoke actuator means includes first spring means imposing a first biasing force on said ring gear means in said first position thereof, and second spring means imposing a second biasing force of said second position thereof, said second force being greater than said first force.

26. A threading machine according to claim 25, wherein said yoke means has axially opposite sides, said yoke actuator means including a generally U-shaped bracket having a bridging portion extending axially across said yoke means in a location circumferentially between said opposite ends and bracket legs axially spaced from and extending radially inwardly of said opposite sides, rod means extending through openings therefor in said bracket legs and said yoke means, said rod means being supported against axial displacement relative to said base means and supporting said bracket for axial displacement relative to said yoke means, said first and second spring means being coil springs surrounding said rod means, each of said coil springs being between one of said opposite sides of said yoke means and the one of said bracket legs facing said one side, and manually actuable means for displacing said bracket in axially opposite directions along said rod means.

27. A threading machine according to claim 26, wherein said manually actuable means includes lever means supported relative to said base means for pivotal displacement in opposite directions about a lever axis transverse to said transmission axis, said bracket including a bridging portion between said bracket legs, said lever means having an end adjacent said bridging portion, and cam and follower means interengaging said lever end and said bridging portion for axially displacing said bracket in response to pivotal displacement of said lever means.

* * * * *

UNITED STATES PATENT AND TRADEMARK OFFICE
CERTIFICATE OF CORRECTION

PATENT NO. : 4,757,598
DATED : July 19, 1988
INVENTOR(S) : James C. Redman

It is certified that error appears in the above-identified patent and that said Letters Patent is hereby corrected as shown below:

Column 3, line 28, "showing" should read --- showings ---.
Column 5, line 11, delete "will". Column 8, line 30, "opposer" should read --- opposed ---. Column 10, line 65, after "axis" (2nd occurrence) insert --- and having cam means thereon spaced from said pivot axis". Column 12, line 33, "of" should read --- on said ring gear means in ---.

Signed and Sealed this

Twentieth Day of March, 1990

*Attest:*

JEFFREY M. SAMUELS

*Attesting Officer*      *Acting Commissioner of Patents and Trademarks*